United States Patent [19]

Rauscher

[11] Patent Number: 4,530,178
[45] Date of Patent: Jul. 23, 1985

[54] TRANSPARENT HOLDER

[76] Inventor: Arthur L. Rauscher, Box 421, Gordon, Ga. 31031

[21] Appl. No.: 519,745

[22] Filed: Aug. 2, 1983

[51] Int. Cl.³ .............................................. A01K 97/08
[52] U.S. Cl. ....................................... 43/26; 43/54.1; 150/52 R
[58] Field of Search ................ 43/26, 54.1; 150/52 R; 224/913, 901; 206/315.11

[56] References Cited

U.S. PATENT DOCUMENTS

| | | | |
|---|---|---|---|
| 679,422 | 7/1901 | Heritage | 43/26 |
| 943,415 | 12/1909 | Jones | 150/52 R |
| 1,020,050 | 3/1912 | Padrick | 150/52 R |
| 2,723,482 | 11/1955 | Marten | 43/26 |
| 2,737,136 | 3/1956 | Ryder | 112/262 |
| 3,142,424 | 7/1964 | Reed, Jr. | 224/32 |
| 3,437,247 | 4/1969 | Gantress | 150/52 R |
| 3,442,314 | 5/1969 | Muller | 150/52 R |
| 3,701,371 | 10/1972 | Stackhouse | 224/913 |
| 3,972,144 | 8/1976 | Geisler | 43/26 |
| 4,222,193 | 9/1980 | Beck | 43/26 |
| 4,249,687 | 2/1981 | Warnier | 224/913 |
| 4,442,623 | 4/1984 | Hawie | 43/54.1 |
| 4,467,551 | 8/1984 | Pulver | 43/54.1 |

Primary Examiner—Gene P. Crosby
Attorney, Agent, or Firm—Fisher, Christen & Sabol

[57] ABSTRACT

A transparent holder for guns, fishing rods, and the like is formed from a single sheet of resilient, flexible, transparent material. The material is cut into an elongated, symmetrical, quadrilateral shape. The material is folded about its axis of symmetry, forming a top edge, an elongated side edge, and a shorter bottom edge. The elongated side edges are placed over one another and sewn together along the entire length; similarly, the bottom edges which overlap are sewn together along their entire length. A first strip having a hook-and-eye type fastener structure is attached to the sheet portion at a point somewhat below the top edge and located at the center of the sheet, and is sewn into place along its edges with the gripping side of the strip exposed. A second hook-and-eye type fastener strip, of identical width, is attached to the top of the underlying sheet at its center with a portion of the strip exposed. Upon insertion of an object into a pocket formed between the sheets, the casing may be closed by folding the top portion over at a point above the first strip toward the facing sheet, so that the strips abut. The thread used is ultraviolet resistant thread, so that it resists rotting. An eyelet is inserted at the bottom of the holder through the two sheets so that in storage, the holder with the article retained within may be hung from the bottom eyelet by a nail.

11 Claims, 9 Drawing Figures

TRANSPARENT HOLDER

BACKGROUND OF THE INVENTION

This invention relates to cases for carrying and storing fishing tackle and particularly to a protective case for carrying fishing rods and reels.

This invention may also be adapted for use as a casing for long-barrelled guns, especially hunting rifles and shotguns.

It is well-known to use portable, flexible cases for carrying fishing rods. Two types of prior art cases are known. In the first type, the case comprises a flexible cloth or fabric sack into which a fishing rod and reel combination can be inserted. In the other type, the casing is inflexible and has a tubular portion for housing a reel end and a thinner, elongated tubular portion for enclosing a shaft portion.

The prior art casings as described above have several drawbacks. The prior art cases are made of relatively heavy, bulky materials. Furthermore, the prior art materials are water absorbent and may rot, mildew, or mold, and by inherent water retention, the fabric materials have a tendency to damage articles placed therein which are made of corrodible or rusting materials. Also, since the prior art materials are difficult to dry, they may be inconvenient to use once they have become wet.

When a number of fishermen or hunters go on a trip together, they cannot readily distinguish their own fishing rods or guns from those of their companions since the prior art casings are generally not transparent. Also, in the case of a lone fisherman or hunger having several fishing rods or guns, that fisherman or hunter may have to open each of the casings of each of the fishing rods or guns he owns in order to choose the appropriate one, since none are contained in transparent casings.

Frequently, it is desirable to place a fishing rod in its casing in a trunk or other like enclosure in which it is necessary that the rod and its respective casing bend. In the case of rigid casings, this is not possible. Since it is often necessary to keep separate several fishing rods so that they do not become entangled with one another, use of individual casings is generally necessary in these instances.

Due to the high price of rigid casings, and the expense and tendency to rot of flexible casings, numerous attempts have been made to produce a fast-drying, flexible casing for fishing rods. Typical of the cases for carrying and storing fishing rods and reels is the type disclosed by Geisler in U.S. Pat. No. 3,972,144 and Gantriss in U.S. Pat. No. 3,437,247.

Geisler discloses a pouch having a plurality of separated sleeves and an open top, one edge of the top having a flap-like projection attached thereto. The flap-like projection has two ears and a further extension having two corners. Altogether, four points are formed, each having a string fixed thereto. In use, the ears are folded over one another overlying reel portions of fishing rod and reel combinations, and the strings are then used to tie the rods to form a bundle. The extension of the flap is then folded over the bundled rods and likewise the strings are tied around the rods in a bundle.

Gantriss shows a rifle cover which protects the rifle from the environment but which permits the rifle to be fired while still in its casing. The casing is formed from light-weight, transparent foldable material which can be folded when not in use. Sides of the casings are heat-sealed at upper and lower edges. A flap is formed at either open end, forming a reverse cuff at both ends. It is the cuffs which retain the article in the casing. Also, a zipper is placed along a central portion of the casing, either along an edge or centrally located in one of the sheets in a generally longitudinal direction.

SUMMARY OF THE INVENTION

It is accordingly one object of the present invention to provide an improved casing which is inexpensive to fabricate, requiring no complex equipment in the fabrication thereof, and that is formed of readily available materials and that can be manufactured by persons of common skill.

Another object of the invention is to provide an improved casing which can be easily placed over a fishing rod or rifle to completely encase the fishing rod or rifle and thereby protect it against the environment.

Another object of the present invention is to provide an improved casing which does not retain water, and which will not readily snag a fishing rod or rifle.

A further object of the present invention is to provide an improved casing which includes a fastening means located at one end for selectively opening or closing the casing which may be accomplished with only one hand and with little or no difficulty.

A still further object of the present invention is to provide a means for hanging the casing upside down upon a nail or hook, so that any moisture present therein will drain out of the casing.

Another further object of the present invention is to provide an improved casing formed of transparent material, whereby a fishing rod or rifle contained within may be readily visually recognized.

A still further object of the present invention is to provide an improved casing which is formed of a single sheet of material folded over and having its edges sewn together for ease of manufacture and attractiveness of appearance.

A still further object of the present invention is to provide an improved casing formed of a single sheet of material, sewn together by ultraviolet, light-treated thread which prevents rotting, whereby the casing may be used outdoors without destruction of the casing.

Another object of the present invention is to provide an improved casing formed of flexible material that is sufficiently thick that it retains its shape and resists permanent deformation.

The improved casing of the present invention comprises a light-weight, transparent, elongated enclosure generally in the shape of either a fishing rod or rifle, having an opening at one end for receiving the fishing rod or rifle and a fastener strip attached to one side of that end permitting the fishing rod or rifle to be completely enclosed. A reclosable fastener element is also provided upon the casing having as a cooperating member the strip attached to the open end on the other side of the casing such that the casing may be selectively folded over and retained in the closed position. Specifically, Velcro ® strips are used to cooperate with one another, one attached to the edge of the open end and the other attached to the opposite side of the casing and spaced from the edge. The casing is preferably made from a light-weight, flexible material, which permits the casing to be folded up for storage and unfolded for use. The casing material is sufficiently thick so as to resist tearing. Transparent plastic material is contemplated, in particular flexible transparent plastic material such as polyethylene, vinyl resins or its copolymers, modified vinyls, cellulose plastics, polyethylene, polypropylene, or polyolefin resins. However, any relatively lightweight, flexible, waterproof, environmentally stable, non-rotting material may be used. Additionally, use of thread to close two of the three edges of the folded sheet material is contemplated. Furthermore, use of ultraviolet, light-treated thread to prevent rotting is contemplated. A fishing rod can be protected by the casing while being carried during fishing expeditions from elements of the environment, such as rain, sharp or scratching objects, and impacts as by falling against hard ground or gravel. Also, during storage, the casing is adapted to be hung from its bottom by an eyelet so that water and moisture may drain from the casing.

Further details and advantages of the present invention appear from the following description of a preferred embodiment shown schematically in the drawings.

DETAILED DESCRIPTION OF THE INVENTION

Figure 1:
FIG. 1 shows a top elevational view of a sheet used in the present invention.

A sheet 1 is shown in FIG. 1 which is cut prior to forming the fishing case of the present invention. The sheet 1 is formed with a first elongated edge 2, a second elongated edge 3, a top edge 4, and a bottom edge 5. The sheet 1 is formed of any flexible material, preferably transparent flexible material, and may be fabricated from cellulose plastics, modified vinyls, vinyl resins, the copolymers of vinyl resins, polyethylene, polypropylene, or polyolefin resins. The sheet 1 may initially be cut from a larger sheet or it may be manufactured already in this form from raw plastic materials. Edge 2 and edge 3 taper away from one another in a direction from the bottom edge 5 going toward the top edge 4. The angle of taper is not critical and may be any predetermined angle. The overall width of edge 5 is predetermined by the width of the narrowest portion of the fishing rod or gun that the casing is intended to carry.

The total width of the top edge 4 is predetermined by the maximum width of the fishing rod or gun which the casing is intended to carry.

Figure 2:
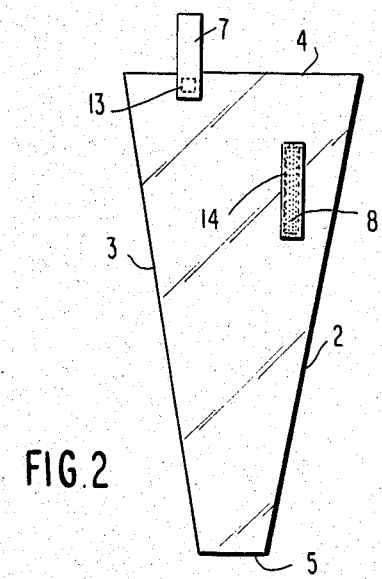
FIG. 2 shows a top elevational view of the same sheet with the detachably adhesive strips attached thereto.

Velcro ® strips are shown secured to sheet 1 in FIG. 2. Strip 7 is formed of Velcro ® and is sewn along a lower portion to sheet 1 with the fastening portion of strip 7 face down in FIG. 2. Strip 8 is also shown in FIG. 2, and is made of Velcro ® material with the fastening surface of strip 8 placed face up in FIG. 2. The strip 8 is stitched by stitches 14 so that the entire strip 8 is securely fastened to sheet 1. Similarly, stitches 13 securely fasten the lower portion of strip 7 to the sheet 1. Strip 7 may be of any length, and any portion of strip 7 may be secured by stitches 13. All that is required is that a sufficient portion of strip 7 overhang the edge 4 so as to be engageable with strip 8 when the casing is finally assembled. Similarly, strip 8 may be of any predetermined length and width, the only requirement being that a sufficient surface area be presented so that it may be engaged by strip 7 when the casing is in its assembled, closed position. In a preferred embodiment strip 7 is approximately 3 inches long and 1 inch wide. Approximately 1 and ¼ inches of the length of the strip is sewn with the adhesive face down in FIG. 2 so that it contacts sheet 1 and is secured thereto by stitches 13. Also in a preferred embodiment, strip 8 is approximately 1 inch in width and approximately 6 inches in length. The stitches 14 in a preferred embodiment extend completely along the periphery of strip 8 and securely fasten it to sheet 1. Also in a preferred embodiment, the stitches 13 extend along three sides of the periphery of strip 7 where it contacts sheet 1, and the stitching also extends along that portion which is adjacent to edge 4 where strip 7 and sheet 1 are in contact.

The threaded portions 13 and 14 are formed by thread sewn through the strips 7 and 8 respectively using any known type of stitching. The stitching penetrates the respective strip as well as sheet 1 so as to fixedly and permanently join them together. Other types of joining may be employed such as adhesive bonding, heat sealing, ultrasonic bonding, riveting, or the like. Nonetheless, the preferred embodiment requires stitching of the strips 7 and 8 to the sheet 1 so as to provide an attractive, pleasing appearance.

The threads used in stitching in a preferred embodiment comprise ultraviolet-light-treated thread to prevent rotting of the thread. Rotting of ordinary thread occurs when the ordinary thread is repeatedly subjected to moisture, air pollutants, mildew, mold, or fungus. Each of these conditions is encountered in an outdoor, watery environment such as that encountered while fishing or hunting. A specific type of ultraviolet-light-treated thread used in the preferred embodiment is Nymo Correcille ™, made by Belding Cortecelli Thread Company. The thread color is not a material part of the invention. Nonetheless, either of two commonly available colors may be used: natural color or blue. The natural color is somewhat beige in appearance. The thread is sufficiently strong to resist tearing or breaking when stressed in normal use.

Figure 3:
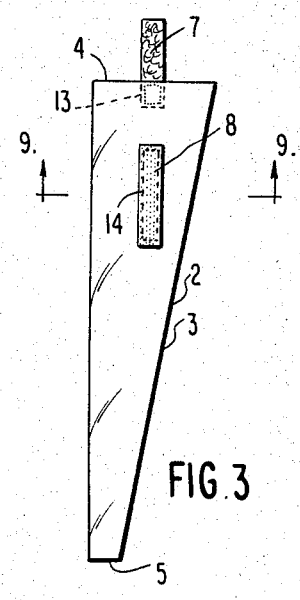
FIG. 3 shows a top elevational view of the sheet material in folded condition.
Figure 4:
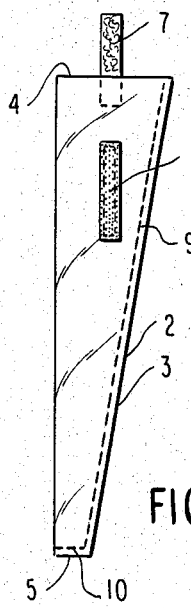
FIG. 4 shows a top elevational view of the casing stitched along its side and bottom edges.

In FIG. 3, the sheet 1 is folded about its vertical center line so that edge 3 overlies edge 2. The top edge 4, as well as the bottom edge 5, is seen in FIG. 3 to form approximately parallel, approximately straight top and bottom edges respectively. Note in FIG. 3 that the detachably adhesive fastening surface of strip 7 is now face up and underlies the sheet 1. The stitching used to secure two edges of the folded sheet 1 is shown in FIG. 4. The stitching is shown as threaded portion 9 along the elongated edge formed by overlapping edges 2 and 3. The bottom threaded portion 10 secures the overlapped edges of bottom portion 5 to one another. The threading is sufficiently strong at portions 9 and 10 so that in normal use, the casing shown in FIG. 4 may contain a fishing rod or a gun without bursting the threaded portion seam. The threaded portion 10 is not so finely stitched as to seriously weaken the sheet 1.

Figure 5:
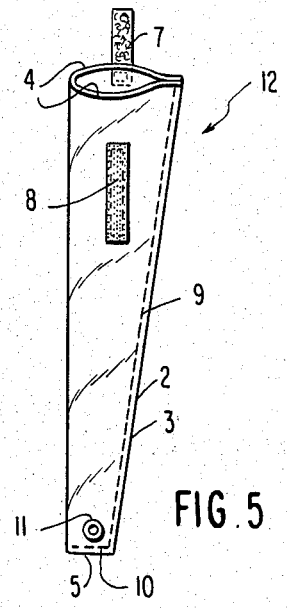
FIG. 5 shows a perspective view of the opened casing having an eyelet inserted through its bottom portion.

An eyelet 11 is shown inserted in conventional manner in the bottom portion near edge 5 in FIG. 5. The eyelet is sufficiently strong so that the casing 12 may be hung from a nail or hook passing through the eyelet and support the weight of the casing and its contents, the contents being selectively a fishing rod or gun. The eyelet may be of any conventional material, and may be of any conventional form so long as it has an aperture therethrough in its central portion so as to admit passage of a nail, hook, or other projection.

In FIG. 1, in a preferred embodiment, for a fishing rod the edge 5 is approximately 2 and ½ inches in length, edge 4 is approximately 16 inches in length, and edges 2 and 3 are each of a length in the range of 4 to 7 and ½ feet, depending on whether it is a fishing rod or a gun which is to be encased. Other lengths may optionally be used so as to fit the particular length of a specific gun or a specific fishing rod.

Figure 6:
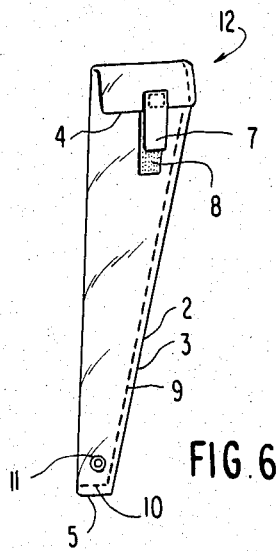
FIG. 6 shows a top elevational view of the casing with its flap fastened in a closed position.

FIG. 6 shows a casing 12 in its closed condition. The top edge 4 is now folded toward the bottom edge 5 at a point approximately intermediate edge 4 and the top of Velcro ® strip 8. This ensures that the maximum contact area occurs between Velcro ® strips 7 and 8. Nonetheless, any fold line may be used which permits overlapping contact of strips 7 and 8 so that they may secure the finished casing 12 in a closed position so as to retain a fishing rod or a gun. The juncture formed at strips 7 and 8 is sufficiently strong so as to resist opening of the casing 12 during normal use of the casing such as hanging upside down by the eyelet 11, or by being carried. The casing 12 may be carried either by manually grasping any portion of the casing or by grasping a handle attached thereto as shown in FIGS. 7 and 8.

Figure 7:
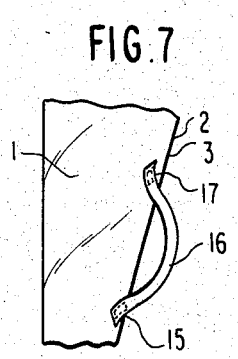
FIG. 7 shows a handle arrangement.
Figure 8:
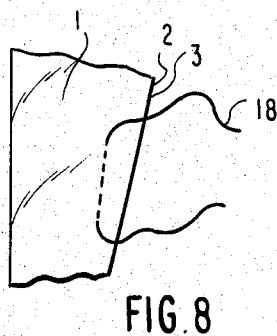
FIG. 8 shows an alternate form handle made of a string.

A strap-type handle 16 is shown in FIG. 7 having both ends of the strap 16 sewn to a portion of the casing, a first end 15 being spaced sufficiently far from a second end 17 so that a hand or arm may pass between strap 16 and the casing 12 for carrying purposes. An alternate form of handle is shown in FIG. 8. A string 18 having two free ends passes into the casing at a first aperture and out of the casing at a second aperture such that the two free ends may be tied together or around another object. Thus the two free ends of string 18 may be tied in a knot so that a hand or arm may pass through the loop formed by string 18 so that a hand or arm may pass therethrough for carrying purposes.

Figure 9:
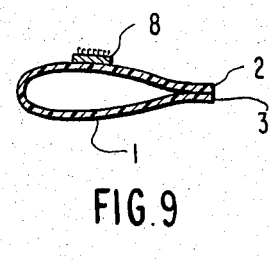
FIG. 9 is a cross-sectional view taken along line 9—9 of FIG. 3 and showing a cross-section of the casing at a midpoint of the Velcro ® strip.

FIG. 9 is a cross-sectional view along the line 9—9 shown in FIG. 3. The sheet 1 and strip 8 are both shown in cross-section in this figure. It is seen in FIG. 9 that edge 2 overlies edge 3. Also, it is seen that the fastening side of the strip 8 is face up and exposed, so that it may grip a like surface of the strip 7 when the casing is in a closed position.

While not specifically shown in the drawings, it is contemplated that the casing may incorporate a zipper at any point therein, which may be sewn into plastic sheet 1. Furthermore, pockets may be sewn onto the casing 12 for convenience. The pockets may be attached by sewing, riveting, stapling, by Velcro ® strips, or the like, so as to fasten the pocket to the sheet 1. Also, if desired, top edges 4 and 5 need not be straight or even completely overlapping, nor need edges 2 and 3 exactly overlie, nor need edges 2 and 3 be straight.

The improved casing of the present invention is capable of achieving the above-enumerated objects and while preferred embodiments of the present invention have been disclosed, it will be understood that it is not limited thereto but may be otherwise embodied within the scope of the following claims.

I claim:

1. A casing for protecting a fishing rod against the elements while permitting it to be selectively removed comprising:

a folded-over sheet of material having an elongated portion, a wide top portion, and a narrow bottom portion and a fold portion;

the elongated portion of the folded-over sheet being joined by a first means for fastening;

said bottom portion of the folded-over sheet being joined by a second means for fastening;

said first means for fastening and said second means for fastening each being adapted to retain the sheet in overlapped condition even while the sheet is under a stress;

a first strip of material having two opposite surfaces, a first surface and a second, detachably adhesive, surface; the first strip being attached to an underlying portion of the folded-over sheet with its detachably adhesive surface facing the sheet;

a second strip of material having two opposite surfaces, a first surface and a second, detachably adhesive, surface; the second strip being fixedly attached to an overlying portion of the folded-over sheet with its detachably adhesive surface facing away from the sheet;

an interior of the folded-over sheet being formed by the elongated side portion, the fold portion, and the bottom portion; said interior being open at a top portion;

said interior portion being adapted to encase an elongated object;

said folded-over sheet being flexible;

said first strip being fixedly attached to said folded-over sheet such that a portion of said first strip is exposed beyond said top portion;

said second strip being spaced from said top portion;

said folded-over sheet being adapted to be folded over at a point approximately midway between said first strip and said second strip so as to cause engagement of said first strip and said second strip;

said first strip and said second strip being adapted to detachably adhere to one another so as to retain the folded-over sheet in a closed condition.

2. A casing as claimed in claim 1, further comprising a means for hanging attached at the bottom portion of the folded-over sheet; whereby the folded-over sheet in its closed position may be hung upside down.

3. A casing as claimed in claim 2, wherein said means for hanging is an eyelet which passes through the overlapping sheets of the folded-over sheet, the eyelet having an aperture therethrough adapted for the passage of an elongated support.

4. A casing as claimed in claim 1, wherein said first means for fastening is stitching and said second means for fastening is stitching whereby the overlapping portions of the folded-over sheet, together with the folded edge and the open top, define the interior.

5. A casing as claimed in claim 1, wherein the detachably adhesive strips comprise hook-and-eye-type fasteners.

6. A casing as claimed in claim 5, wherein said strips further comprise Velcro ® fastening material.

7. A casing as set forth in claim 5, wherein each strip is fixedly attached to the folded-over sheet by stitched thread.

8. A casing as set forth in claim 7, wherein the means for fastening further comprises an ultraviolet-light-treated thread adapted to prevent rotting, whereby the folded-over sheet may be used in an outdoor environment.

9. A casing as claimed in claim 1, further comprising a handle adapted for manually carrying the folded-over sheet.

10. A casing as set forth in claim 9, wherein said handle has two ends, first end fixedly attached to a portion of the folded-over sheet, and a second end spaced from said first end and fixedly attached to a portion of said folded-over sheet; the length of said strip being such as to provide clearance between said folded over sheet and said strap sufficient to permit the strap to be used as a handle.

11. A casing as set forth in claim 9, wherein said handle is a string passing through a first aperture in said folded-over sheet and passing out through a second aperture spaced from said first aperture, said string having a first free end and a second free end, such that the string is adapted to be knotted so as to form a loop about an object.

* * * * *